Figure 1:
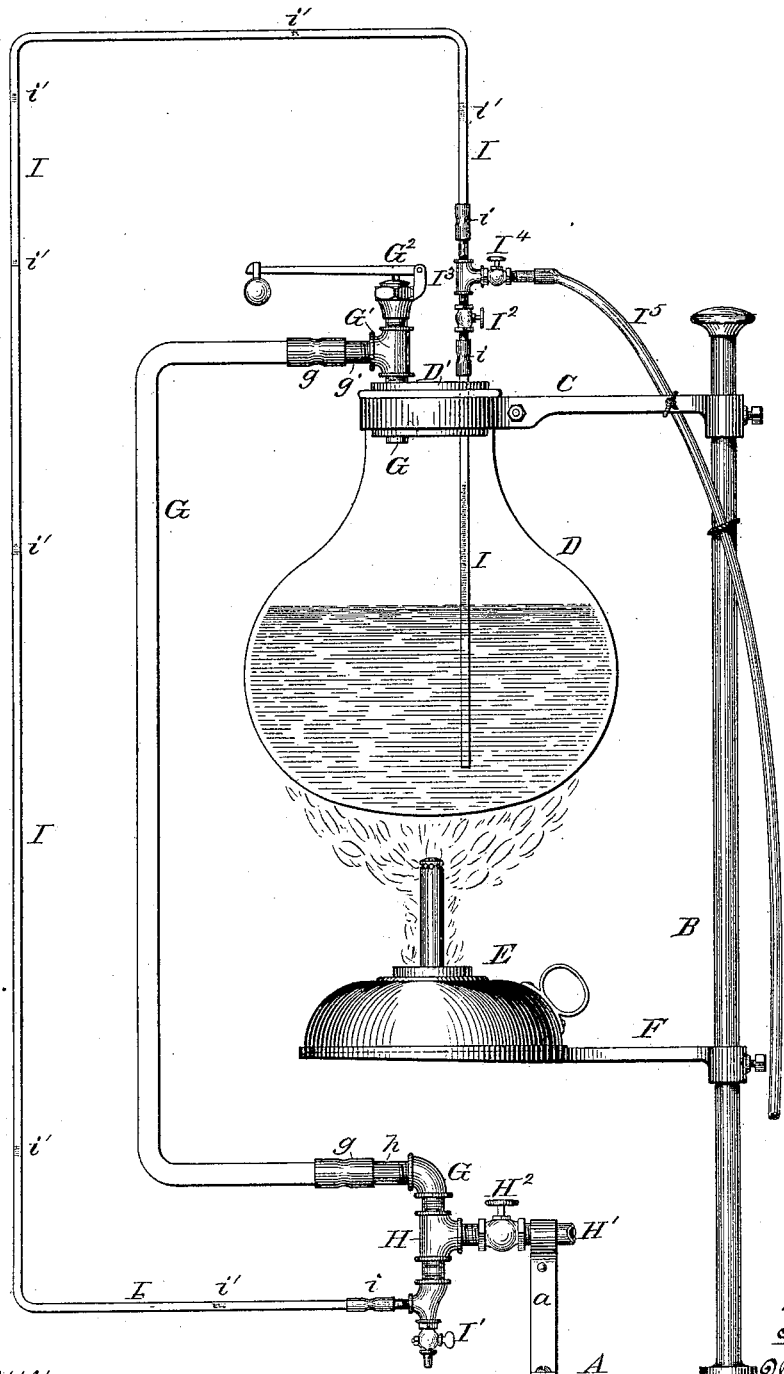

(No Model.) 2 Sheets—Sheet 1.

W. IRVING.
APPARATUS FOR RETURNING WATER OF CONDENSATION TO GENERATORS.

No. 394,859. Patented Dec. 18, 1888.

Witnesses:

Inventor:
William Irving
by Dayton Poole & Brown Attorneys

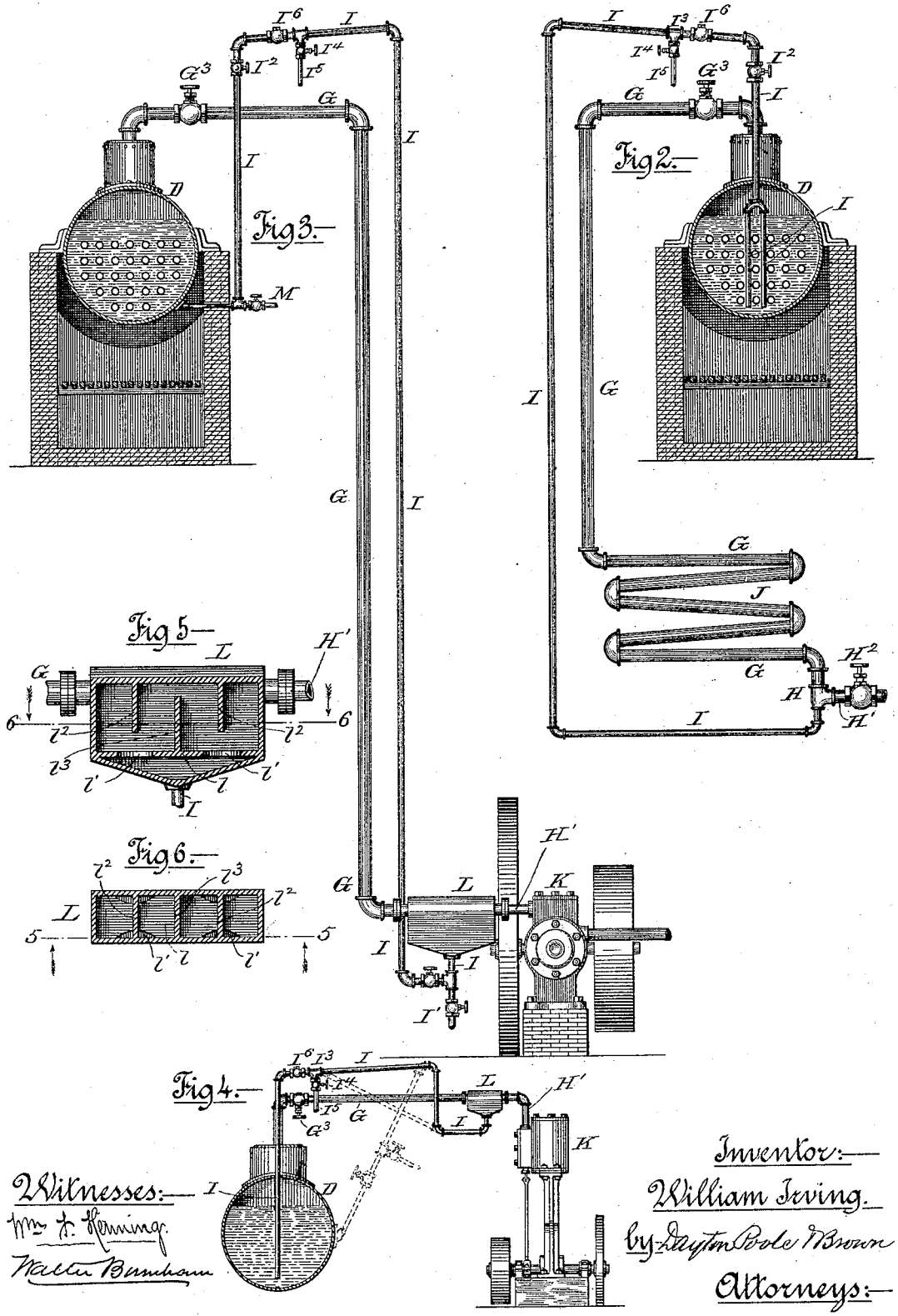

UNITED STATES PATENT OFFICE.

WILLIAM IRVING, OF CHICAGO, ILLINOIS.

APPARATUS FOR RETURNING WATER OF CONDENSATION TO GENERATORS.

SPECIFICATION forming part of Letters Patent No. 394,859, dated December 18, 1888.

Application filed February 7, 1888. Serial No. 263,225. (No model.)

*To all whom it may concern:*

Be it known that I, WILLIAM IRVING, of Chicago, in the county of Cook and State of Illinois, have invented certain new and useful Improvements in Apparatus for Returning Water of Condensation to Steam-Generators; and I do hereby declare that the following is a full, clear, and exact description thereof, reference being had to the accompanying drawings, and to the letters of reference marked thereon, which form a part of this specification.

The primary object of my invention is to provide for the return or delivery of water from a steam-pipe to a generator by the direct agency of steam, and under conditions which require water to be raised from a lower to a higher level on its course from the steam-pipe to the generator.

The phenomena of my invention having been studied and its principles determined by means of a laboratory apparatus provided with transparent generator and piping through which the movements of steam and water therein could be seen, the invention will be first explained by reference to a simple form of such laboratory apparatus, which is illustrated in Figure 1, and which returns the water from a point in the steam-pipe below the water-level of the generator. In this figure, (1,) A represents a base; B, a standard rising from the base; C, a bracket which suspends a wide-mouthed glass vessel, D, that serves as a steam-generator, and E a lamp supported on a bracket, F. Through the stopper D' of the vessel D is inserted a pipe, G, which opens in the steam-space of the generator, and which, externally to the generator, leads to a point which, as shown in the drawings, is considerably below the water-level of said generator. The unshaded part of this pipe G is transparent, and is connected at its ends with metal parts G' and H of the same pipe, G. $G^2$ is a safety-valve. H is a short metal prolongation of the pipe G, having a vertical direction, as here shown, and from its lower end a glass pipe, I, leads upward some distance above the water-level in the generator, and thence downward through the stopper D' into the generator, in which it terminates in an open end below the water-surface. H' is a pipe leading from H as a prolongation of the steam-pipe, and is provided with a stop-valve, $H^2$. I' is a petcock leading from the lower end of H. $I^2$ is a valve in the descending part of the pipe I, and $I^3$ is a T in said pipe I, having a stop-valve, $I^4$, connected with its lateral branch and beyond the valve is a rubber tube, $I^5$, to prevent water escaping from the valved branch of the T upon the glass generator. The connections $g\ g\ i\ i$ uniting the glass to the metal parts of the pipes are short sections of rubber tube stretched over the ends of the pipes which they join. Manifestly but a very low steam-pressure can be obtained in the apparatus thus constructed; but sufficient pressure can be produced therein to give the operation which characterizes my invention.

The pipe I will be, as a whole, termed the "return-pipe." The parts of the return-pipe may be separately designated as follows: the lower horizontal part the "bottom level," the adjacent ascending part the "riser," the upper horizontal or transverse part the "leader," and the part which descends into the boiler the "drop pipe" or "leg."

To start the apparatus shown in Fig. 1, close valves I', $I^2$, and $H^2$, open the valve $I^4$, and light the lamp. Steam generated in the vessel D will enter the pipe G and pass through the pipe I to the atmosphere through the valve $I^4$, expelling the air from the pipes. In this flow of steam through the pipes G and I water of condensation and entrainment is swept along with it at a high velocity, such water taking the form in this apparatus of small detached masses, (represented at $i'\ i'\ i'$.) In addition to the water in this form, of course any water held in suspense by the steam is also taken upward thereby. When the apparatus is warmed up, (the pipes G and I being full of steam,) close the valve $I^4$. The water of condensation, together with any water entrained into the pipe G with the steam, will continue to be carried in small masses through the pipe I into the leg thereof, and, unless the valve $I^2$ be opened, will fall and rest upon said valve. The water thus delivered into the leg of the pipe I may, if accumulated above the valve $I^2$, be withdrawn from time to time at the valve $I^4$, or, by opening the valve $I^2$, it may be delivered continuously into the water-space of the boiler. In a practical apparatus the latter is the operation or result which will ordinarily be desired. Upon opening the valve I² water will of course rise in the pipe I to a point above the water-level of the generator, as indicated, and the drop-pipe should be of sufficient length to contain this water column.

The explanation of the movement of water through the pipe I into the generator when the valve I² is open is as follows: The space in the pipe I above the level of the water in its leg and extending indefinitely in this pipe is subject to lower average pressure than any part of the circuit D G I, the head of the column—i. e., its height above the water-level in the generator—being the measure of such reduced pressure in I. This space in the pipe I may have a sufficiently less pressure by reason of radiation and condensation; but, if not, condensation may be supplemented by escape, as by the valve I⁴, adjusted to give a restricted outflow of steam. The greater pressure of the generator is exerted toward this space of reduced pressure by way of the drop-leg, and also by way of the pipes G and I through their junction at H. The water column in the drop-leg, however, (being self-adjusted in head to the difference in pressure above and below it,) retains its place, while the steam from the pipe G rushes to the place of lowest pressure in the pipe I with a force due to the difference between the pressure at that place in the pipe I and the pressure in the steam-pipe G. In this movement of steam it picks up small bodies of water and transports them to the drop-leg, where they join the water column therein and become part of the water body of the generator. The steam which rushes to this low-pressure region of the circuit is itself also condensed and becomes water, (or in part discharged through I⁴,) and its place is taken by other steam from the same source, so that a constant flow of steam and water is maintained through the pipe I toward the generator. In other words, a continued circulation is kept up from the generator outwardly through the steam-pipe G and backwardly to the generator through the return-pipe I, notwithstanding the rise in the latter pipe, which may practically be of any height desired.

The operation described is accompanied by a constant rise and fall within narrow limits of the water column in the drop-leg, which fluctuations are due, manifestly, to the intermittency of condensations of the steam supplied to the space above it. This return movement of water through the pipe I will continue with certainty at least so long as the aggregate volume of water in the riser or ascending part of the pipe I does not exceed that of the water column in the drop-leg. It may even continue through short and separate periods of time in which the aggregate of the masses in the riser exceeds the mass in the leg; but such action cannot be relied on for long periods. To insure certain and continuous return of water by the return-pipe I, the leg of said pipe should be made of such length above the level of the generator as to give a column in said leg certainly greater than any aggregate of water masses that will at any time occupy the riser.

A body of water in the lower level, or in the lower level and lower parts of the riser and the steam-pipe G, accumulated in the cooling down of the apparatus, may be removed before starting either by discharging it at the cock I' (having first opened I⁴) or by blowing it off through the valve I⁴.

The pipe H' is intended to represent such a continuation of the steam-pipe G as in a practical apparatus may lead to one or more engines or other steam-using devices. The opening of the valve H² does not stop the action of the circuit D G I, as above described.

In looking for the conditions which underlie the operation above set forth, it will be observed, first, that a difference of pressure must be established between the low-pressure space or chamber in the pipe I and the steam-pipe G equal to the accomplishment of the work of elevating whatever water said steam-pipe shall furnish plus whatever may be condensed in the lower and ascending portions of the return-pipe; second, that the water column constitutes a sufficient obstacle to the outflow of the contents of the boiler through the drop-leg, while it permits the entrance of water from the return-pipe to the generator; and, third, that the drop-leg or descending portion of the return-pipe must be of sufficient height to accommodate a water column with head enough to balance the unequal pressures above and below it.

Speaking of my invention as illustrated in Fig. 1 and as above described, I point out that, first, the raising of water in particles or detached masses through a pipe by a current of steam and its delivery into a steam-generator without the intervention of a trap, pump, or other mechanical agency, as attained by the apparatus described, is a new achievement in steam apparatus; and, second, a return-pipe connected with a steam-pipe leading from a generator, which return-pipe has an ascent succeeded by a descent and terminates in the generator, and which is provided with a liquid obstacle therein that prevents the outflow of the contents of the generator while permitting the inflow of water to the generator, whereby water may be carried by a steam-current through the ascending and into the descending portion of the pipe, is also new.

Certain adaptations of my invention will next be described by reference to Figs. 2, 3, and 4 of the accompanying drawings, representing practical apparatuses.

Fig. 2 shows a steam-pipe leading from a generator to a point below the water-level of said generator, where it supplies a heating-coil, J, and a return-pipe leading from the steam-pipe beyond the coil for the return of water of condensation to the generator. Fig. 3 shows a steam-engine located below the water-level of the generator and a return-pipe, I, connected with the steam-pipe at a point near the engine. This figure also shows an enlarged chamber or box connected in the steam-pipe and called a "separator," with the bottom of which the receiving end of the return-pipe is connected. Fig. 4 shows the same elements as Fig. 3, but with the loop or circuit formed by the pipes G and I entirely above the water-level of the generator, except the lower end of the drop pipe or leg of the return-pipe. Figs. 5 and 6 are respectively vertical and horizontal sections of that form of separator represented in side view in Fig. 2, the sections being taken on lines indicated and showing the interior construction of the separator.

Preserving the lettering of Fig. 1 (so far as it applies) in describing the remaining figures of the drawings, D is a steam-generator, G a steam-pipe leading therefrom, and I a return-pipe communicating with both the steam-pipe and the generator. In Figs. 2, 3, and 4 the return-pipe I has an ascending intermediate portion, through which water is to be raised by the direct agency of steam in the manner described of Fig. 1.

J, Fig. 2, is a steam-coil, which may represent any form of steam-heater and any extent of such heating apparatus possibly located wholly or in part below the water-level of the generator. H is a prolongation of the steam-pipe, which may connect with an engine or other steam-using device which takes steam bodily out of said pipe, or which, in other words, constitutes a physical discharge of steam.

K, Fig. 3, represents a steam-engine connected with the steam-supply pipe G and L a separator connected in the pipe G for the more perfect separation of the water of condensation, suspension, and entrainment formed and carried along in the steam-pipe to this point. The return-pipe in this figure, instead of passing through the top of the boiler and through the steam-space into the water, descends outside the boiler and connects with the feed-pipe M, which enters the boiler laterally below the water-level therein. In this case the descending portion or leg of the pipe I is of course occupied by water from the boiler precisely as though it entered the boiler directly, and it is found in practice that the connection thereof with the feed-pipe, even when the latter is in operation, in no way impairs or materially affects the desired action of the return-pipe. This form of connection is preferred as utilizing for two pipes a single connection with the generator.

In each of the Figs. 2, 3, and 4 the return-pipe is provided in its elevated part with an escape-pipe, $I^5$, having a valve, $I^4$, by which the air may be expelled preliminary to the operation of the circuit. Said valved escape may also be used to supplement the action of condensation in the pipe I in securing a needful reduction of pressure above the water column in the return-pipe to enable the required amount of work to be done in the return-pipe.

In each of the Figs. 2, 3, and 4 the return-pipe is shown provided with a check-valve, $I^6$, and a stop-valve, $I^2$, between the escape-pipe $I^5$ and the generator. These two valves $I^2$ and $I^6$ are mainly alternative, the check-valve being preferable. Its use is to prevent the outflow of the contents of the generator when the escape-valve is opened widely in blowing out air or water from the return-pipe, and its outflow into the return and steam pipe when a valve, $G^3$, in the steam-pipe is closed, or its escape through the return when the circuit is broken or damaged. The check-valve has no agency in the normal operation of the apparatus, and may be placed in the descending part or leg of the return-pipe, if preferred.

In Figs. 2, 3, and 4 also the upper transverse portion or leader of the return-pipe I is shown as declining toward the boiler—a construction calculated to facilitate the movement of its liquid contents toward the low-pressure chamber therein, and found more especially useful in those cases in which this leader is of great length.

In Figs. 3 and 4 an engine, K, is shown connected with the loop G I adjacent to its outer extremity, or, in other words, connected with the steam-pipe G at a point near its junction with the return-pipe.

Several advantages of the return-pipe connected with a steam-pipe supplying an engine or other steam-using device have been set forth in another application for patent filed by me of even date herewith, in which a return-pipe is employed containing a space of low pressure, whereby an active flow of steam is established and maintained from the steam-pipe to such space of low pressure, and in which the return-pipe having such low-pressure chamber is claimed, irrespective of its having an ascent on its way from the steam-pipe to the generator. In said other application the drawings show the return-pipe in some cases as having such an ascent, though not from a point below the water-level of the generator. The advantages there enumerated, or some of them, are of course present in all cases, without reference to the lifting of the return water. The lifting of the return-water from a point below the water-level of the generator is itself an additional advantage, while the lifting of the return-water from a point not below the water-level of the generator, as shown in Fig 4, is only a requirement in those cases wherein it would otherwise be impossible to obtain the necessary length of drop-pipe to accommodate a water column of the needful height.

Exact proportions of the steam and return pipes cannot be specified for all situations; but, as affording a general suggestion, it may be stated that with a three-inch steam-pipe leading under cover to an engine one hundred and fifty feet from the generator and twenty-eight feet below water-level in the generator a return-pipe one and one-fourth inch in diameter has been found to work successfully and economically. A too large return-pipe will operate to prevent the establishment and maintenance of the desired reduction of pressure in the low-pressure chamber of said return-pipe, while one that is too small will give too great a reduction of pressure in said chamber for the available space for head and drop-leg. It is to be observed that the water to be raised is not a column of the height of the riser, but one or several relatively small masses in the form of short pistons, transversely filling the riser, or of waves on the sides of the riser, or of globules suspended in the steam. The aggregate weight of all the masses of water in a riser of, say, fifty feet in height may, therefore, be no more than one, two, or three pounds, and the excess of pressure in the steam-pipe over that in the low-pressure chamber will need to be only sufficient to raise this weight of water against its gravity and friction. The judgment of the constructer or operator will be called into play in particular cases, and the size of a riser may require to be increased or diminished after observation of its working. In such observations it will be noticed that the velocity of the steam-flow in the riser is a material consideration, such velocity being greater in a small than in a large pipe.

While it is always desirable to locate the separator at the junction of the return with the steam-pipe near the engine, it will not always be practicable to place the separator so close to the engine, as shown. I therefore do not wish to be restricted in my claim to the immediate proximity of these elements. They will in practice be preferably placed as near to each other as circumstances will permit. When two or more engines are connected with the prolongation H' of the steam-pipe, one may be, and generally will be, at a greater distance from the separator than the other, while both will have the advantage of my invention, though in differing degrees.

Reference is made to the other application for patent filed by me of even date herewith as showing several matters which are shown herein.

The term "generator" as herein employed is intended to apply to a secondary as well as a primary source of steam supply or pressure, and the terms "water column" are to be understood as applying to any liquid column, as oil or other liquid, occupying the leg.

I claim as my invention—

1. The combination, with a steam-generator and a steam-pipe leading therefrom, of a return-pipe connecting the steam-pipe with the generator, said return-pipe rising above its connection with the steam-pipe and descending to the generator, and containing in its descending portion a pressure-balancing liquid column, and above said liquid column a space subject continuously to sufficiently low pressure to enable steam flowing continuously from the steam-pipe to such low-pressure chamber to raise water to said chamber from the steam-pipe, whence the water may descend into the generator by gravity.

2. The combination, with a steam-generator and a steam-pipe leading therefrom, of a return-pipe leading to the generator from a point in the steam-pipe below the water-level of the generator, which return-pipe contains a chamber elevated above the water-level of the generator, subject continuously to lower pressure than that of the steam pipe or generator, and has a descending portion containing a pressure-balancing liquid column between the low-pressure chamber and the contents of the generator, whereby steam will continuously raise water from the steam-pipe to the low-pressure chamber, whence the water falls into the generator.

3. The combination, with a steam-generator, a heating coil or radiator, and a steam-pipe leading from the generator to the coil, of a return-pipe connecting the coil with the generator, said return-pipe rising above its connection with the coil and descending to the generator, and containing in its descending portion a pressure-balancing liquid column, and above said column a space subject continuously to sufficiently low pressure to enable steam flowing continuously from the coil to such low-pressure space to raise water to said chamber from the coil, whence the water may descend by gravity into the generator.

4. The combination, with a steam-generator, a heating coil or radiator located below the water-level of the generator, and a steam-pipe leading from the generator to the coil, of a return-pipe connecting the coil with the generator, said return-pipe rising above the water-level of the generator and descending thence to the generator, and containing in said descending portion a pressure-balancing water column, above which is a space subject continuously to sufficiently low pressure to enable steam flowing continuously from the coil to such low-pressure chamber to raise water from the coil to the low-pressure chamber, whence the water may fall into the generator.

5. The combination, with a steam-generator, an engine or other steam-using device, and a steam-supply pipe leading from the generator to the engine, of a return-pipe connecting the steam-pipe with the generator, said return-pipe rising above its connection with the steam-pipe and descending to the generator, and containing in its descending portion a pressure-balancing liquid column, and above said liquid column a space subject continuously to sufficiently low pressure to enable steam flowing continuously from the steam-pipe to such low-pressure chamber to raise water to said chamber from the steam-pipe, whence it may descend into the generator by gravity.

6. The combination, with a steam-generator, an engine or other steam-using device, and a steam-supply pipe leading from the generator to the engine, of a return-pipe leading to the generator from a point in the steam-pipe below the water-level of the generator, which return-pipe contains a chamber elevated above the water-level of the generator subject continuously to lower pressure than that of the steam pipe or generator, and has a descending portion containing a pressure-balancing liquid column between the low-pressure chamber and the contents of the generator, whereby steam will continuously raise water from the steam-pipe to the low-pressure chamber, whence the water may fall into the generator.

7. The combination, with a steam-generator, an engine or other steam-using device, and a steam-supply pipe leading from the generator to the engine, of a return-pipe which connects the steam-pipe with the generator and which rises between its said connections to a point above the level of water in the generator, said return-pipe containing a steam-space of continuously lower pressure than any other point in the circuit, and also containing a liquid column between said low-pressure space and the contents of the generator, and a valved escape-passage leading from the low-pressure space of the return-pipe.

8. The combination, with a steam-generator, an engine or other steam-using device, and a steam-supply pipe leading from the generator to the said steam-using device, of a return-pipe leading from the steam-pipe to the generator and provided with an ascending portion through which steam rises, carrying water in small masses, and a descending portion which contains a pressure-balancing liquid column, and a check-valve in the return-pipe arranged to open toward the generator.

9. The combination, with a steam-generator and a steam-pipe leading from the generator, of a return-pipe leading from the steam-pipe upward to a point above the water-level of the generator, thence at a declension toward the generator, and then downward into the generator for a vertical distance sufficient to contain a liquid column due to the difference in pressure between the generator and the low-pressure space in the return-pipe.

10. The combination, with a steam-generator and a steam-pipe leading from the generator, of a separator connected to the steam-pipe and a return-pipe having a drainage-connection with the separator and leading to the generator, said return-pipe rising above its connection with the separator and descending to the generator, and containing in its descending portion a pressure-balancing liquid column and above said liquid column a space continuously subject to sufficiently low pressure to enable steam flowing continuously from the steam-pipe through the separator and return-pipe to such low-pressure chamber to raise the water delivered to the return-pipe from the separator.

11. The combination, with a steam-generator and a steam-pipe leading from the generator and having a part thereof below the water-level in the generator, of a separator connected to the steam-pipe at such low point and a return-pipe leading from the separator to a point above the water-level of the generator, and thence downward into communication with the generator, and containing in its descending portion a liquid column of a height due to the difference in pressure between the generator and the interior of the return-pipe above the column.

12. The combination, with a steam-generator and a steam-pipe leading from the generator, of a separator connected to the steam-pipe and a return-pipe having a drainage-connection with the separator and rising above the water-level of the generator, thence running at a declension toward the generator, and then downward into the generator for a vertical distance sufficient to contain a liquid column due to the difference in pressure between the generator and the low-pressure space in the return-pipe.

13. The combination, with a steam-generator and a steam-pipe leading from the generator, of a return-pipe connecting the steam-pipe with the generator and provided with a descending portion containing a pressure-balancing water column, and a water-feed pipe leading into the return-pipe, whereby return-water continuously enters the generator together with any feed-water admitted through the feed-pipe.

In testimony that I claim the foregoing as my invention I affix my signature in presence of two witnesses.

WILLIAM IRVING.

Witnesses:
WALTER BURNHAM,
C. CLARENCE POOLE.